(12) United States Patent
Clegg

(10) Patent No.: US 7,520,425 B2
(45) Date of Patent: Apr. 21, 2009

(54) SLIDE-OUT GIFT CARD

(75) Inventor: Tim Clegg, Torrance, CA (US)

(73) Assignee: Americhip Inc., Torrance, CA (US)

( * ) Notice: Subject to any disclaimer, the term of this patent is extended or adjusted under 35 U.S.C. 154(b) by 271 days.

(21) Appl. No.: 11/377,261

(22) Filed: Mar. 16, 2006

(65) Prior Publication Data

US 2007/0215694 A1 Sep. 20, 2007

(51) Int. Cl.
*G06K 5/00* (2006.01)
(52) U.S. Cl. .................. 235/380; 235/493; 150/147
(58) Field of Classification Search ............. 150/147; 235/492, 451, 472.01, 486, 380
See application file for complete search history.

(56) References Cited

U.S. PATENT DOCUMENTS

| | | | | |
|---|---|---|---|---|
| 5,845,218 A | * | 12/1998 | Altschul | 455/565 |
| 6,445,347 B1 | * | 9/2002 | Yoshimi | 343/702 |
| 6,754,344 B2 | * | 6/2004 | Kohli et al. | 379/446 |
| 7,278,570 B2 | * | 10/2007 | McGee et al. | 235/380 |
| 7,278,584 B1 | * | 10/2007 | Gandel et al. | 235/492 |
| 2005/0011776 A1 | * | 1/2005 | Nagel | 206/39 |
| 2005/0119023 A1 | * | 6/2005 | Sudo et al. | 455/550.1 |

\* cited by examiner

*Primary Examiner*—Michael G Lee
*Assistant Examiner*—Rafferty Kelly
(74) *Attorney, Agent, or Firm*—Clement Cheng

(57) ABSTRACT

A stored value card device has a housing comprising an upper shell and a lower shell. The card device is dimensioned similar to typical credit cards and contains a circuitry for producing an audio/visual message in an inner space formed between the upper and lower shells, which are shaped like opposing trays. The two shells join together through a simple complementary engagement. A card component slides out from the bottom of the lower shell, which has two-tiered structure for mounting the card component. An electronic message device is retained in the cubic space of the housing which includes a power supply, a processing device, an audio and/or video player, and a switch triggered by a push button on the upper shell, thereby the stored value card device provides two independent operations as an electronic message player and as a convertible card in a thin profile at the same time.

16 Claims, 4 Drawing Sheets

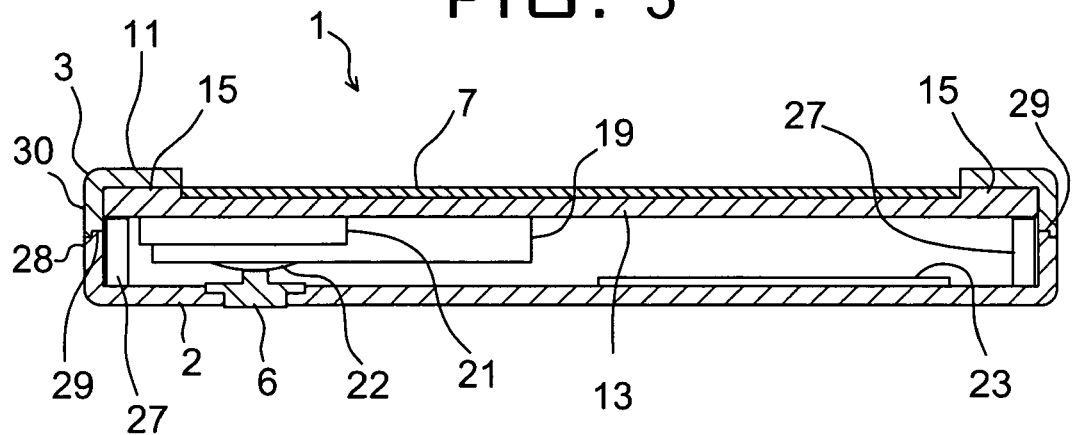
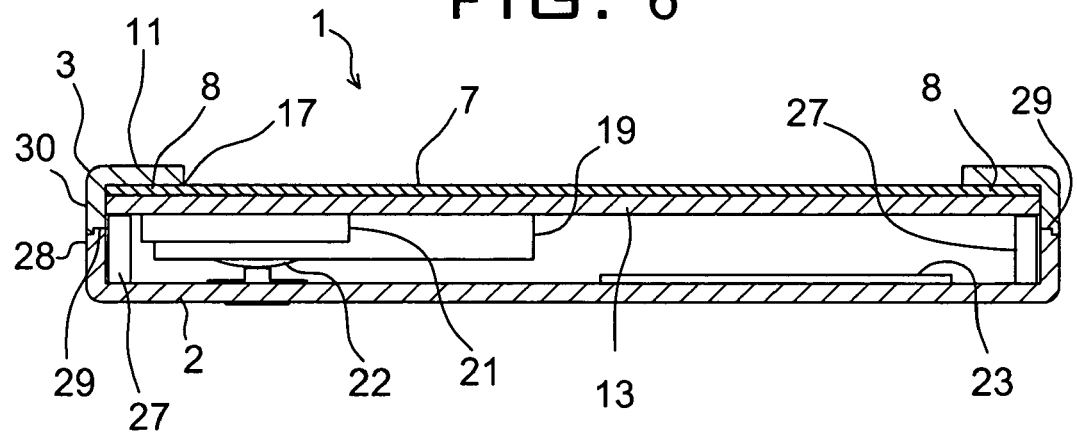

SLIDE-OUT GIFT CARD

BACKGROUND OF THE INVENTION

A. Field of the Invention

The present invention relates to a stored value card. More particularly, the present invention relates to a value card device that has an audio/visual message effect while slidingly dispenses the card for use with various transaction systems.

B. Discussion of Related Art

Stored value cards referred to as visa cards, debit cards, credit cards, gift cards or pre-paid cards in the retail market contain manually or electronically retrievable monetary values in them and are used as indirect payment methods between the issuing merchants and the customers in purchasing the merchant products or services. They are great for offering goods and services as gifts where cash exchanges are not preferred over thoughtful presentation of a value card, which also provides good range of freedom for the card holder to choose her or his desired item in the store that the card giver selected.

The values stored may be only a dollar or at any increments set by the issuer and agreed upon by the card customer who initially pays for the card value. So, the indistinctive shape of card may have one of a wide range of money amounts printed or written on an appropriate space of the card itself. Oftentimes, there is no monetary amount printed on the card.

Unfortunately, when the stored value has been spent, the cards are normally tossed away because the actual card may have no value. This can be against the gift a givers' wish that their gestures be remembered along with what they gave, in this case the card itself. There have been efforts to provide more expressive stored value cards by individual merchants to promote such card transactions and increase sales. An improvement to the existing cards was to change the package adapted to hold the card in merchandising display at the stores into more attractive designs to transfer between individuals.

An improvement to the gift card suggested by the inventor in Stored Value Card With Light U.S. patent application Ser. No. 11/038,018 is equipped with a light emitting diode, which is push-button activated to emit light combined with printed graphics. The previous improvement was a success in that it included lights and sound to a gift card. The previous improvement had a first primary panel, a secondary primary panel spaced from the first primary panel. The first primary panel defines an account identifier signifying a financial accounting linked to the stored value card. A side is defined between the first primary panel and the second primary panel. The light circuit is located inside the housing and has a switch. The light extends from the side of the housing and can be eliminated by pushing the push button switch. The message cards are found to work well as contemplated. In order to contain the electronic parts, that card device came to have a modified thickness of more than ¼" compared to normal 0.30 mil of card as accepted by most card reading machines.

Therefore, the retrieval of stored value information was limited to a reading means of a bar code system. That is, the card has a bar code printed on it and scanned at the time of redemption by a cashier with a barcode scanner.

However, the equally important swipe readers in the stores cannot access such card information due to the dimensional abnormality. It is, therefore, necessary to improve the card device to work with both point of sale or POS systems so that the value card devices can be adapted to almost all of the current POS systems such as smart chip cards and magnetic swipe cards.

Embodiments of the invention will now be described by way of example with reference to the accompanying drawings.

SUMMARY OF THE INVENTION

A stored value card device has a housing comprising an upper shell and a lower shell. The card device is dimensioned similar to a typical credit card in its length and width but with a thickness to secure an internal space to retain an electronic device for producing audio/visual messages between an upper shell and a lower shell of the housing. The upper shell has a switch button protruding slightly where switching terminals of the circuitry underlies. The two shells join together through a simple complementary engagement. A convertible card component slides out from the bottom of the lower shell, which has two-tiered structure for mounting the card component in a guide slot.

The card component is planar and has two opposite longer sides and two opposite shorter sides as well as an outer surface and an inner surface, the outer surface having a magnetic stripe of a financial data extending along one of the longer sides and a pair of tabs extending from the shorter sides of the card body opposite to the magnetic stripe, wherein the taps of the card component is received in the guide slots of the lower shell so that the magnetic stripe is slidingly exposed by a push of a finger to facilitate a machine reading of the financial data.

The two-tiered lower shell has an outer plate with a large rectangular opening located near one of its four sides communicating with a lateral opening through which the card component enters the inside surface of the outer plate. An inner plate is positioned at the inside of the outer plate of the lower shell to cover at least the rectangular opening. The inner plate is generally flat except that it is slightly raised at a longer edge opposite to the card entrance for limiting the innermost sliding movement of the card and two short protrusions near the lateral opening for stopping the card's outermost sliding movement.

Thus, the card is adapted to slide in two opposite guide slots collectively formed by the outer plate and the inner plate and limited by the edge and the short protrusions.

The electronic message device may be a printed circuit board that holds a memory chip, a battery and a switch while the upper shell has a speaker bonded thereto and the push button. The battery-powered memory chip or microprocessor stores a programmed sound note and when triggered by the depression of switch outputs its content to the speaker though a couple of connecting wires. In its simplest form of visual effect, a light emitting diode may be connected in harmony with printed graphics on the face of the upper shell.

The electronic messaging means may include a power supply, a processing unit, a speaker and/or video display, and at least one switch triggered by said push button of said upper shell, whereby said stored value card device provides two independent operations as an electronic message player and as a convertible card in a thin profile at the same time. The processing unit may be one or more flash memories and a microprocessor for controlling the memories.

In an implementation of the present invention, the card component is a gift card that may be redeemed to a zero value and the electronic message device is composed of disposable components including a one-time use battery as the power source. The electronic message means is a memory chip for storing a sequence of data, which can be expressed in an audio and/or video format.

Alternatively, the card component is a reusable credit card, which allows recurring credit transactions and the electronic message device may be an independent multimedia player for an extended repetitive usage. In such case, the multimedia player is an audio and/or video player having the processing unit with a rechargeable battery as the power supply for a lengthy repetitive usage.

The upper and lower shells of the housing are made of plastic material by injection molding and then fastened together by screws. Alternatively, the upper and lower shells are made of leather or leatherette patterns interconnected by stitching and/or metal fasteners.

BRIEF DESCRIPTION OF THE DRAWINGS

FIG. 5 is a simplified sectional view as seen along the line 5-5 of FIG. 2; and

FIG. 6 is a simplified sectional view as seen along the line 6-6 of FIG. 2.

Similar reference numbers denote corresponding features throughout the attached drawings.

DETAILED DESCRIPTION OF THE PREFERRED EMBODIMENT

Figure 1:
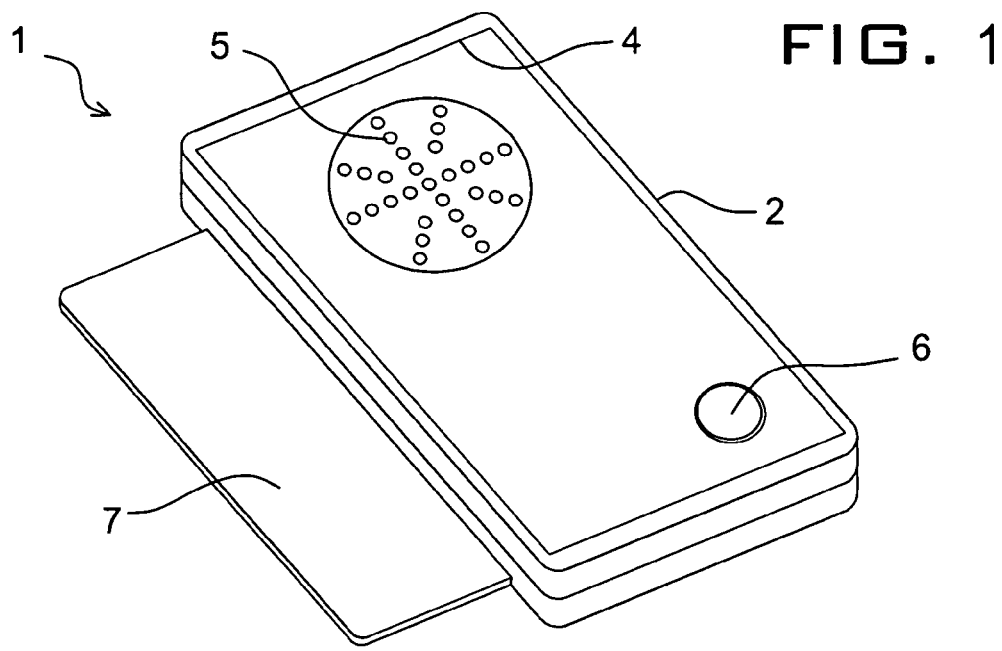
FIG. 1 is a perspective view of the top of a card device according to the present invention.
Figure 2:
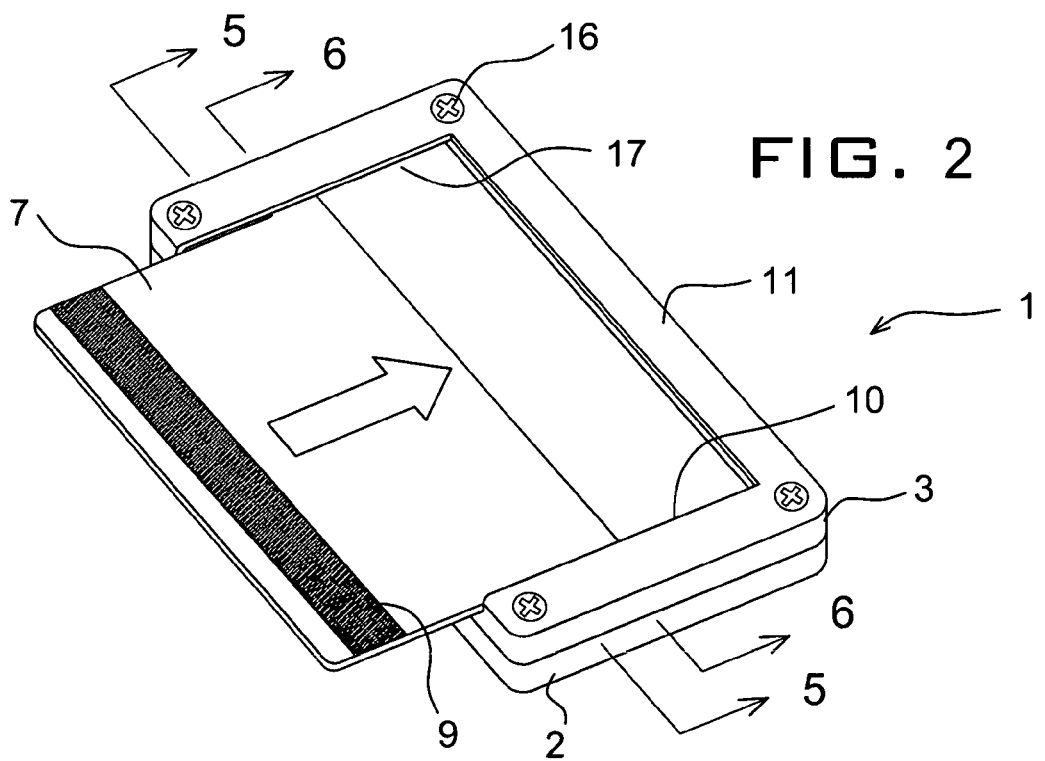
FIG. 2 is a perspective view of the bottom of the card device of FIG. 1.

With reference to FIGS. 1 and 2, a card device 1 has a housing comprising an upper shell 2 and a lower shell 3. The card device 1 is dimensioned similar to typical credit cards in that it has an area of 3⅜" length×2⅛" width except its thickness of about 5/16". The device 1 may include an electronic device for producing an audio/visual message in an inner space formed between the upper and lower shells 2 and 3, which are shaped like opposing trays.

Top surface of the upper shell 2 is substantially flat and chamfered at all the four corners. There is a slightly depressed inner rectangular area 4 for receiving a decorative graphics layer to be bonded thereto. At one side of the top surface of the upper shell 2 are formed perforations 5 in a circular area under which a speaker is attached to transmit the sound effect better.

At a corner of the upper shell 2 a switch button 6 protrudes slightly where switching terminals of the electronic device underlies. The two shells 2 and 3 join together through a simple complementary engagement as will be described later in more detail. A convertible card component 7 slides out from the bottom of the lower shell 3, which has two-tiered structure for mounting the card component 7. The shells 2 and 3 may be made of plastics through injection molding.

Figure 3:
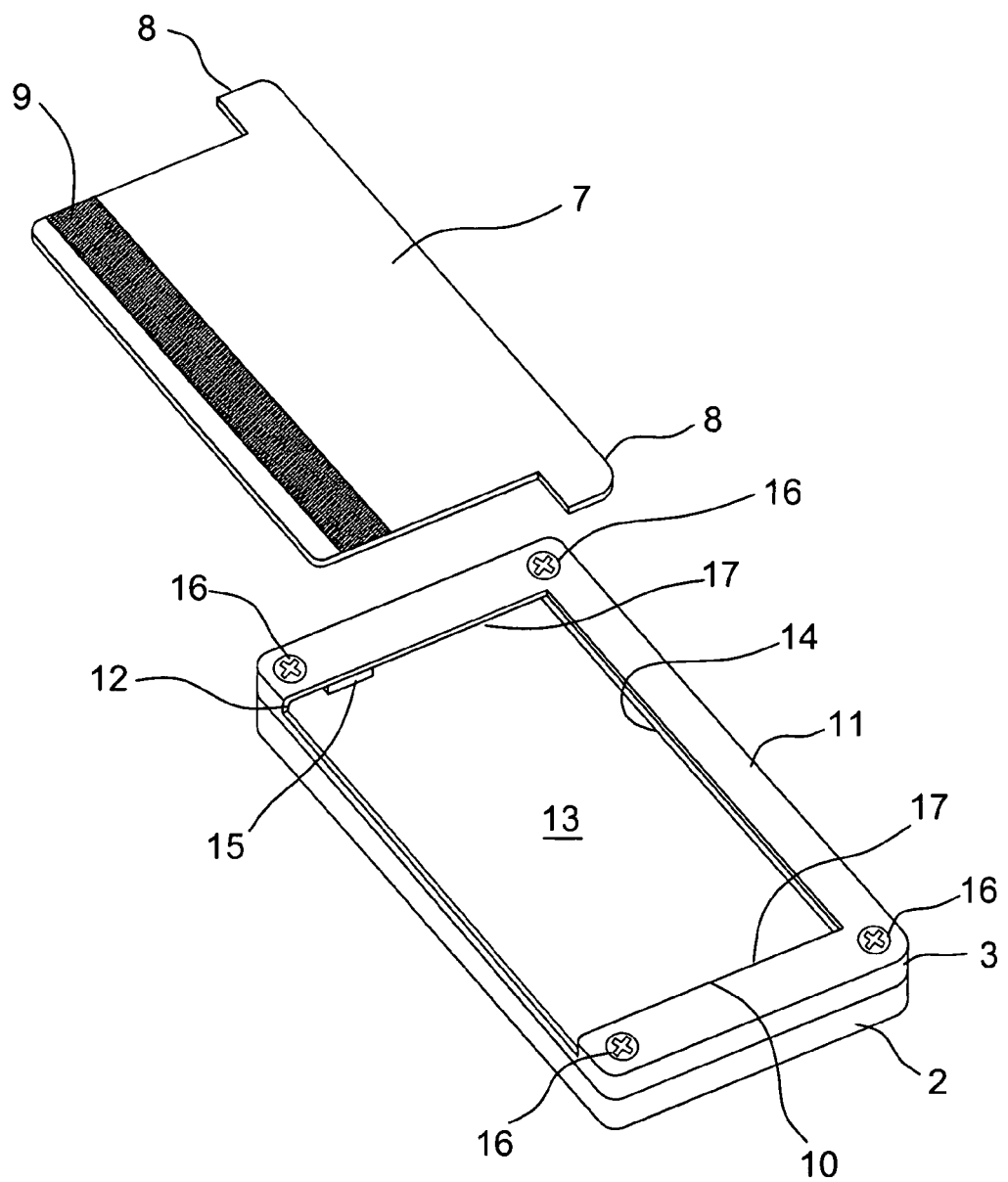
FIG. 3 is an exploded perspective view of a card component and housing before they are assembled into the one shown in FIG. 2.

Turning the card device 1 upside down reveals the complete view of the card component 7 slidably received at its opposite tabs 8 in the lower shell 3 as shown in FIGS. 2 and 3. The card component 7 is generally smaller than the housing of shells 2 and 3 and has a magnetic stripe 9, which contains financial data including the value stored for the card device 1 at an edge away from the tabs 8.

The lower shell 3 has a rectangular opening 10 surrounded at three sides by an outer plate 11 of the lower shell 3 leaving a lateral opening 12 through which the card component 7 slides on the inside surface of the outer plate 11. An inner plate 13 is positioned at the inside of the outer plate 11 of the lower shell 3 to cover at least the rectangular opening 10. The inner plate 13 is generally flat except that it is slightly raised at a longer edge 14 for limiting the innermost sliding movement of the card 7 and two short protrusions 15 near the lateral opening 12 for stopping the card's outermost sliding movement.

With the inner plate 13 positioned between the upper and lower shells, they may be fastened together by screws 16 at the four corners of the shell housing. Alternatively, a chemical adhesive or heat welding may bond the shells 2 and 3.

Thus, the card 7 is adapted to slide in two opposite guide slots 17 collectively formed by the outer plate 11 and the inner plate 13 and limited by the edge 14 and the short protrusions 15.

Figure 4:
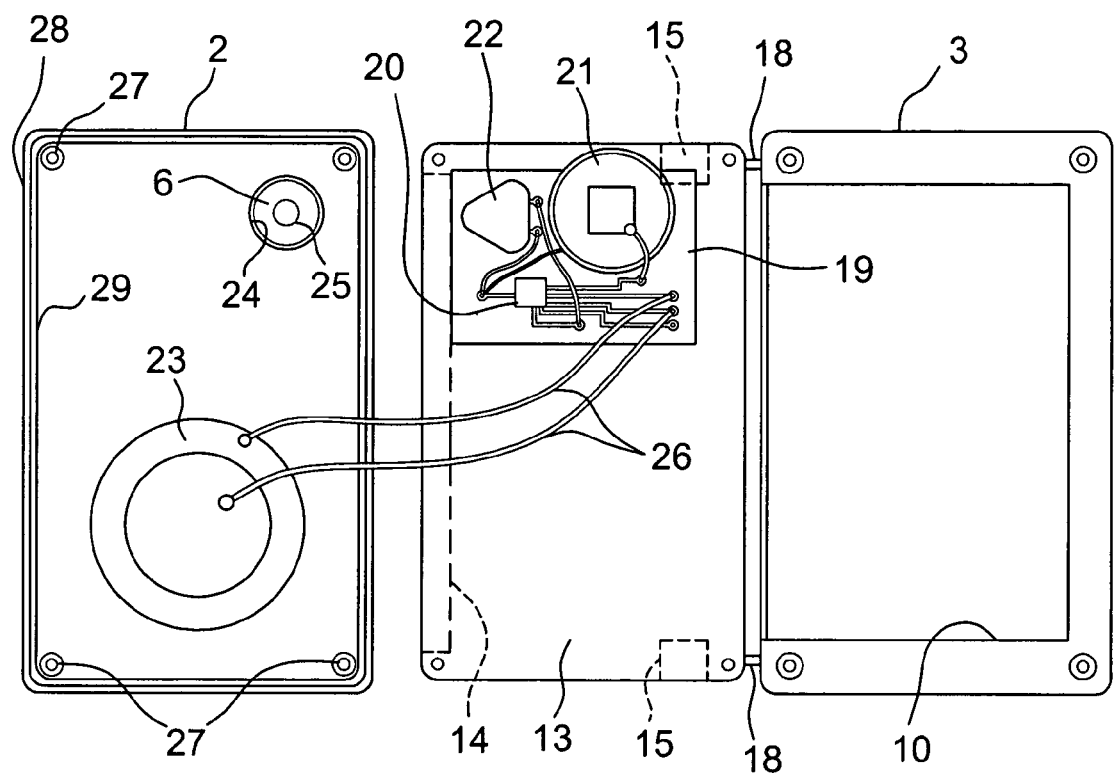
FIG. 4 is an exploded view of the housing showing the connections of components of an electronic message device of the present invention.

FIG. 4 shows the bottom view of the upper and lower shells 2 and 3 in their disassembled state with the inner plate 13 attached to the lower shell 3 by a pair of sprues 18 connecting the two components since they are formed of a one-piece material. The inner plate 13 may support at its one side an electronic message device having a printed circuit board 19 that holds a memory chip or microprocessor 20, a battery 21 and a switch 22 while the upper shell 2 may have a speaker 23 stuck thereto and the push button 6 which is seated from inside of the upper shell 2 on a through hole 24, which is aligned right above the switch 22.

The switch button 6 may be separately made and fitted in the hole 24 or integrally formed with the upper shell 2 so that it cantilevers at a portion of the hole 24. Protruding inwardly of the shell 2 at the center of the button 6 is a pin 25 that makes pressing contact with the switch 22. The switch 22 normally biases the button 6 upward away from the switch terminals underneath the switch 22 in order to keep the button 6 at a raised position in preparation for another depression.

The battery 21 powered memory chip 20 stores a programmed sound note and when triggered by the depression of switch 22 outputs its content to the speaker though a couple of connecting wires 26. Although it is not shown for simplicity, a light emitting diode may be connected to the wires 26 to enhance the message effect visually.

At the four corners of the upper shell 2, screw posts 27 protrude inwardly thereof to receive screws 16 therein. In addition, the upper shell 2 has four sidewalls 28, which are perpendicular to its top surface and terminated by stepped end surfaces 29 for engaging with complementary counterpart of the lower shell 3.

Then, the inner plate 13 is folded about the sprues 18 to the interior of the lower shell 3 and snuggly fitted therein so that the circuit board 19 faces the speaker 23 when the two shells 2 and 3 are fastened.

FIGS. 5 and 6 clearly show the positional relations of the components of the assembled card device 1 in cross sectional views. Comparing FIGS. 5 and 6, the card 7 is seated on the inner plate 13 and generally maintains sliding abutments with the inner edges of the protrusions 15 in a tight fit so that it slides only with a finger push by the user while it extends beyond the protrusions 15 at its tap 8 areas to reach perpendicular walls 30 of the lower shell 3 inside of the outer plate 11 to keep the card 7 in the slots 17.

Also, the screw posts 27 of the upper shell 2 extend in parallel with the sidewalls 28 above its end surfaces 29 pushing the inner plate 13 against the inside surface of the outer plate 11.

The switch 22 of the circuit board 19 resides in the interior of the card device 1 so that it is held in close proximity with the button 6 that lets the owner to play a stored message independently of the operation of the card 7, which can be handed over to a merchant for swiping just as with traditional credit cards or other stored value cards.

Therefore, while the presently preferred form of the gift card has been shown and described, and several modifications thereof discussed, persons skilled in this art will readily appreciate that various additional changes and modifications may be made without departing from the spirit of the invention, as defined and differentiated by the following claims.

The electronic message device in the present embodiment is chosen on the assumption that the card component is a gift card that will be redeemed to a zero value and the electronic device is preferably composed of disposable components including a one-time use battery 21 as the power source.

Otherwise, as for the electronics that may be contained in the housing of the card device, the present invention contemplates no limitation to its simpler built-in configuration illustrated as long as the housing can physically hold the state of the art electronic modules for playing multimedia messages in any audio/video formats. The player may be an independent video and/or MP3 music player with an appropriate adaptation of the face of the upper shell 2 to include a modified pattern of the through hole 24 and its overlying decorative layer to expose control areas of the player.

The shells 2/3 may be made of a non-plastic material like pressed leather or leatherette wherein the pattern parts similar to the structures described above can be interconnected by stitching and/or metal fasteners replacing the screws 16.

The housing can be partially transparent or translucent to fully envelope or encapsulate the light circuit and light. In this case, any light permeable housing should suffice. This may have the advantage of a waterproof unit. The alternative is to have apertures in the housing so that the light encapsulated within the housing can shine through the holes. Little apertures or little holes can be made in a variety of shapes such as circular or star shaped. The best mode has been to use a small light emitting diode or small LED and fit the lighted end of the LED into small apertures.

Although the drawings show the card sliding out along a certain side of the carrier, the card can be adapted, and the slot can be adapted to provide a variety of sliding configurations such as sliding out any of the four sides of the card carrier, or sliding in a non linear fashion, or sliding in a rotational manner where the card is affixed to the carrier at an axis. The slotted connection can be formed in either the upper shell, .the lower shell or in a combination of the upper and lower shell. The housing is also called the carrier, because it carries the card as well as the electrical components. The term video in this case, does not necessarily mean moving graphical pictures, and is used as a synonym for the term visual. The term information in this application refers to media in form visual or audio form.

Between the built-in implementation and independent implementation of the electronics device of the present invention, the combinations of the card component and the electronic device may be decided based on business merits rather than a technical limitations.

CALL OUT LIST OF ELEMENTS

1: Stored Value Card Device
2: Upper Shell
3: Lower Shell
4: Inner Rectangular Area
5: Perforations
6: Switch Button
7: Card Component
8: Tabs
9: Magnetic Stripe
10: Rectangular Opening
11: Outer Plate
12: Lateral Opening
13: Inner Plate
14: Raised Edge
15: Short Protrusion
16: Screw
17: Guide Slot
18: Sprue
19: Printed Circuit Board
20: Memory Chip
21: Battery
22: Membrane Switch
23: Speaker
24: Through Hole
25: Pin
26: Wire
27: Screw Post
28: Sidewall
29: Stepped End Surface
30: Perpendicular Wall

The invention claimed is:

1. A slide-out stored value card device comprising:
a housing having an upper shell and a lower shell fastened to said upper shell with an internal space between said shells, said upper shell being generally flat with side walls and having on a flat surface an external display to provide viewers with a card identification as well as other saved information and at least one control button for relaying external depressions to said internal space and said lower shell having an outer plate being formed with a large rectangular opening and having four perpendicular side walls and an inner plate in a two-tiered structure to form a pair of parallel guide slots between said two plates of said lower shell;
a planar card body having two opposite longer sides and two opposite shorter sides as well as a lower surface and an upper surface, said lower surface having a magnetic stripe of a financial data extending along one of said longer sides and a pair of tabs extending from said shorter sides of said card body opposite to said magnetic stripe, wherein said tabs of said card body being received in said guide slots of said lower shell so that said magnetic stripe is slidingly exposed by a push of a finger to facilitate a machine reading of said financial data; and
an electronic messaging means retained in said cubic space of said housing which includes a power supply, a processing unit, and a speaker and at least one switch triggered by said control button.

2. The slide-out stored value card of claim 1, wherein said processing unit of said electronic messaging means is a memory chip for storing a sequence of data which can be expressed in an audio or video format.

3. The slide-out stored value card device of claim 1, wherein said card body is a gift card that may be redeemed to a zero value and said electronic messaging means is composed of disposable components including a one-time use battery as the power supply.

4. The slide-out stored value card of claim 1, wherein said upper and lower shells of said housing are made of plastic material by injection molding and said shells are fastened together by screws.

5. The slide-out stored value card device of claim 1, wherein said card body is a credit card, which allows recurring credit transactions and said electronic messaging means is an independent multimedia player having one or more flash memories and a rechargeable battery for a lengthy repetitive usage.

6. The slide-out stored value card of claim 1, wherein said upper and lower shells of said housing are made of leather or leatherette patterns interconnected by stitching and/or metal fasteners.

7. The slide out stored value card device of claim 1, wherein said processing device is a microprocessor for controlling one or more flash memories.

8. The stored value card of claim 1, wherein a video display includes an internal light fully maintained within the housing, and the illumination of the internal light is visible through a light permeable portion of the housing.

9. The stored value card of claim 1, wherein the pair of parallel guide slots is adapted to provide a rotational sliding path wherein the card is affixed to the carrier at an axis of rotation.

10. A stored value card comprising:
    a housing including an upper shell and a lower shell forming the space between the shells, wherein the housing forms a slot shaped to receive a card;
    a card having an account identifier signifying a financial account is linked to the stored value card, wherein the card fits into the slot and has a sliding connection to the housing in an extended position, and a retracted position;
    wherein the card has a pair of tabs diametrically opposed and extending from a rear portion of the card, wherein the tabs glidingly fit in into guiding slots formed on the housing, wherein the tabs extend away from each other;
    a sound circuit including a speaker and a switch, the sound circuit being generally enclosed within the housing.

11. The stored value card of claim 10, further comprising a light circuit including a light and a switch, the light circuit being generally enclosed within the housing but for the light, wherein the light extends from the housing and is configured to be illuminated upon application of a force to the switch.

12. The stored value card of claim 10, further comprising a light circuit including a light and a switch.

13. The stored value card of claim 10, further comprising a light circuit including an internal light fully maintained within the housing, and the illumination of the internal light is visible through a light permeable portion of the housing.

14. The stored value card of claim 10, wherein the slot is adapted to provide a rotational sliding path wherein the card is affixed to the carrier at an axis of rotation.

15. A slide-out stored value card device comprising:
    a housing having an upper shell and a lower shell fastened to said upper shell with an internal space between said shells, said upper shell being generally flat and receiving a printed graphic; with four perpendicular side walls and having a flat surface to provide viewers with card identification and other information and at least one control button for relaying external depressions to said internal space and said lower shell having an outer plate being formed with a large rectangular opening and having four perpendicular side walls and an inner plate in a two-tiered structure to form a pair of parallel guide slots between said two plates of said lower shell; wherein the upper shell has a printed graphic image on a top surface; and
    a planar card body having two opposite longer sides and two opposite shorter sides as well as a lower surface and an upper surface, said lower surface having a magnetic stripe of a financial data extending along one of said longer sides and a pair of tabs extending from said shorter sides of said card body opposite to said magnetic stripe, wherein said tabs of said card body being received in said guide slots of said lower shell so that said magnetic stripe is slidingly exposed to facilitate a machine reading of said financial data; and
    an electronic messaging means retained in a hollow space of said housing which includes a power supply, a speaker and a light and at least one switch trigger;
    wherein an inner plate is formed to the interior of the lower shell so that a circuit board faces the speaker when the shells are fastened.

16. The stored value card of claim 15, further comprising a light circuit wherein the light circuit includes an internal light fully maintained within the housing, and the illumination of the internal light is visible through a light permeable portion of the housing.

* * * * *

UNITED STATES PATENT AND TRADEMARK OFFICE
CERTIFICATE OF CORRECTION

PATENT NO. : 7,520,425 B2  
APPLICATION NO. : 11/377261  
DATED : April 21, 2009  
INVENTOR(S) : Clegg et al.

Page 1 of 1

It is certified that error appears in the above-identified patent and that said Letters Patent is hereby corrected as shown below:

On the Title Page under item (12) should read as:
Clegg et al.

(75) Inventor(s):

On the Title Page under item (75) Inventor: should read as:
Tim Clegg, Torrance, CA (US)
Ted C. Halbur, Lino Lakes, MN (US)
Travis M. Robertson, Minnetonka, MN (US)
David B. Smith, Falcon Heights, MN (US)

Signed and Sealed this
First Day of March, 2016

Michelle K. Lee
*Director of the United States Patent and Trademark Office*